United States Patent
Saquib

(10) Patent No.: US 7,373,011 B2
(45) Date of Patent: May 13, 2008

(54) DENSITY-DEPENDENT SHARPENING

(75) Inventor: Suhail S. Saquib, Shrewsbury, MA (US)

(73) Assignee: Polaroid Corporation, Concord, MA (US)

( * ) Notice: Subject to any disclaimer, the term of this patent is extended or adjusted under 35 U.S.C. 154(b) by 763 days.

(21) Appl. No.: 10/960,143

(22) Filed: Oct. 7, 2004

(65) Prior Publication Data

US 2006/0077470 A1    Apr. 13, 2006

(51) Int. Cl.
*G06K 9/40* (2006.01)
(52) U.S. Cl. .................................... 382/255
(58) Field of Classification Search ............... 382/254, 382/255, 260–269, 274–275; 358/3.26–3.27, 358/462–465, 447–448
See application file for complete search history.

(56) References Cited

U.S. PATENT DOCUMENTS

| | | | |
|---|---|---|---|
| 5,392,137 A | 2/1995 | Okubo | 358/462 |
| 5,867,606 A | 2/1999 | Tretter | 382/261 |
| 6,252,995 B1 | 6/2001 | Takamori | 382/254 |
| 6,304,341 B1 | 10/2001 | Koide et al. | 358/1.9 |
| 6,411,305 B1 | 6/2002 | Chui | 345/660 |
| 6,807,299 B2 * | 10/2004 | Sobol | 382/166 |
| 7,269,300 B2 * | 9/2007 | Braun et al. | 382/298 |
| 2002/0097439 A1 | 7/2002 | Braica | 358/3.26 |
| 2002/0163670 A1 | 11/2002 | Takahira | 358/3.27 |

FOREIGN PATENT DOCUMENTS

| | | |
|---|---|---|
| EP | 1 330 114 A2 | 7/2003 |
| JP | 58151773 A | 9/1983 |
| JP | 61230571 A | 10/1986 |
| JP | 03036672 A | 2/1991 |
| JP | 7-274004 | 10/1995 |
| JP | 07274004 A | 10/1995 |
| JP | 2001-197311 | 7/2001 |
| JP | 2001197311 A | 7/2001 |

* cited by examiner

*Primary Examiner*—Jose L. Couso

(57) ABSTRACT

A sharpening filter is disclosed for performing density-dependent sharpening on digital images. In one embodiment, a digital image to be sharpened is decomposed into a plurality of high-pass versions of the image at different resolutions. These high-pass images are gained at each resolution and recombined with the original image to produce a sharpened version of the image. The gains that are applied at each resolution are density-dependent. As a result, the effects of density-dependent blurring are counteracted, such that the sharpness of the final printed image is independent of the print density. Techniques are disclosed for performing such density-dependent sharpening with a high degree of computational efficiency.

22 Claims, 15 Drawing Sheets

DENSITY-DEPENDENT SHARPENING

CROSS REFERENCE TO RELATED APPLICATIONS

This application is related to commonly owned U.S. Pat. No. 6,801,233 B2 entitled "Thermal Imaging System," which is hereby incorporated by reference.

BACKGROUND

1. Field of the Invention

The present invention relates to digital image processing and, more particularly, to techniques for sharpening digital images.

2. Related Art

The above-referenced patent entitled "Thermal Imaging System" discloses a printing medium having multiple color-forming layers. Referring to FIG. 1, a schematic diagram is shown of the structure of one embodiment of the media 100 disclosed in the above-referenced patent application. Two of the colorants, yellow and magenta (which for purposes of illustration are shown as one layer but which typically are present in separate layers) 102a, are in close proximity to the top of the media 100, and the third colorant, cyan 102c, is separated from them by a relatively thick base 102b of about 125 μm. Note that the layers 102a-d are not drawn to scale in FIG. 1. Rather, the base layer 102b is much thicker relative to the remaining layers 102a and 102c-d than illustrated in FIG. 1. A TiO$_2$ layer 102d at the bottom of the media 100 provides a white background for an image printed on the media 100. All of the layers 102a-d in the media 100 have essentially the same index of refraction, and the TiO$_2$ layer 102d can be modeled as a diffuse Lambertian reflector.

Referring to FIG. 9, a graph 900 is shown which illustrates the sharpness quality factor (SQF) of edges printed on the media 100 (axis 902b) as a function of mean edge density (axis 902a). As is well-known to those having ordinary skill in the art, SQF is a measure of perceived sharpness. Curve 904a is a plot of mean edge density vs. SQF for a prior art media, such as the media 100 shown in FIG. 1. It can be seen from plot 904a that SQF is a strong function of mean edge density, and that the printed edges lose sharpness as the density decreases. In other words, more blurring occurs at lower densities than at higher densities.

Returning to FIG. 1, this phenomenon may be understood by tracing a path 104 that light takes through the media 100. Upon entry of light into layer 102a of the media 100, a ray of light follows a straight path (based on the assumption that all of the layers 102a-d have the same index of refraction) until it hits the TiO$_2$ layer 102d. The TiO$_2$ layer 102d scatters the incident light, which reemerges from the TiO$_2$ layer 102d at a random angle following the cosine law of a Lambertian reflector. The reflected light from the TiO$_2$ layer 102d follows a straight path back to the surface of the media 100 (through layers 102c, 102b, and 102a).

If the angle of incidence of this reflected light on the media/air interface is large, it will suffer a total internal reflection back into the media 100, as shown in FIG. 1. The process just described will repeat until the ray of light is reflected by the TiO$_2$ layer 102d at a small enough angle such that it does not suffer total internal reflection at the interface of the media 100 and the air 106, and thereby escapes out of the media 100 into the air 106.

Given the large thickness of the base layer 102b, these multiple reflections within the media 100 cause the light to travel a substantial distance laterally (the distance between points 108a and 108b in FIG. 1), resulting in a loss of edge sharpness. The perceived density at any point is obtained by averaging the intensity of rays that have traversed all possible paths through the media 100. This averaging in the linear intensity domain makes the loss in sharpness a function of print density. An edge printed at low density, therefore, is less sharp than an equivalent edge printed at high density.

What is needed, therefore, are techniques for counteracting the effect of such density-dependent blurring to sharpen printed digital images.

SUMMARY

A sharpening filter is disclosed for performing density-dependent sharpening on digital images. In one embodiment, a digital image to be sharpened is decomposed into a plurality of high-pass versions of the image at different resolutions. These high-pass images are gained at each resolution and recombined with the original image to produce a sharpened version of the image. The gains that are applied at each resolution are density-dependent. As a result, the effects of density-dependent blurring are counteracted, such that the sharpness of the final printed image is independent of the print density. Techniques are disclosed for performing such density-dependent sharpening with a high degree of computational efficiency.

For example, in one aspect of the present invention techniques are provided for processing a source image by: (A) identifying a first portion of the source image having a first density $d_0$; (B) identifying a first gain $g_0$ based on the first density $d_0$; (C) applying a sharpening filter with the first gain $g_0$ to produce a first portion of a sharpened image; (D) identifying a second portion of the source image having a second density $d_1$ that differs from the first density $d_0$; (E) identifying a second gain $g_1$ based on the second density $d_1$, wherein the second gain $g_1$ differs from the first gain $g_0$; and (F) applying the sharpening filter with the second gain $g_1$ to produce a second portion of the sharpened image.

In another aspect of the present invention, techniques are provided for processing a source image by: (A) initializing a sharpened version of the source image; (B) for each of a plurality of resolutions l, performing steps of: (1) identifying a gain G associated with resolution l; (2) identifying a projection P of the source image onto a basis function B associated with resolution l; (3) updating the sharpened version of the source image at resolution l based on the gain G and the projection P; and (4) providing the updated sharpened version of the source image as a final sharpened version of the source image.

Other features and advantages of various aspects and embodiments of the present invention will become apparent from the following description and from the claims.

DETAILED DESCRIPTION

Figure 6A:
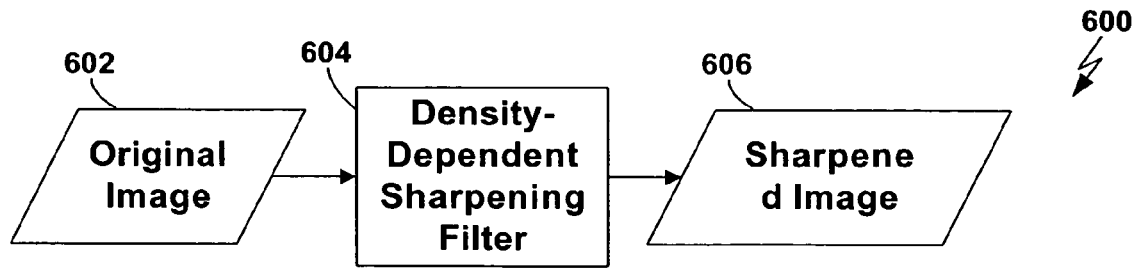
FIG. 6A is a block diagram of a density-dependent sharpening system according to a first embodiment of the present invention.
Figure 7A:
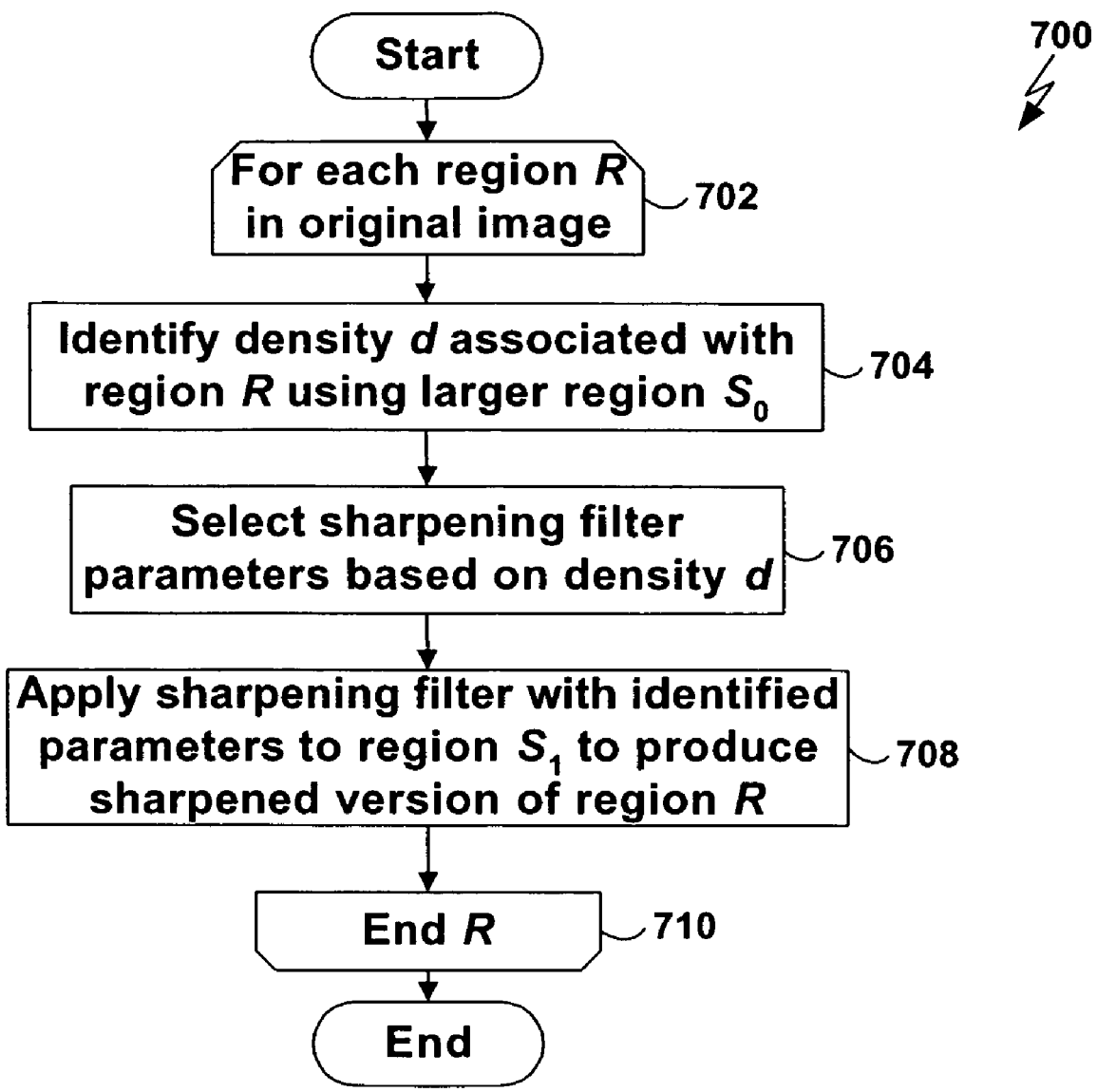
FIG. 7A is a flowchart of a method for performing density-dependent sharpening according to one embodiment of the present invention.

Referring to FIG. 6A, a block diagram is shown of a sharpening system 600 according to one embodiment of the present invention. The system 600 includes an original image 602 which is sharpened by a density-dependent sharpening filter 604 to produce a sharpened image 606. Referring to FIG. 7A, a flowchart is shown of a method 700 that represents one straightforward way for the system 600 to perform density- or gray level-dependent sharpening. In general, the method 700 performs filtering in the spatial domain and varies the filter support and shape from one region (e.g., pixel) to another.

More specifically, the method 700 enters a loop over each region R (e.g., each pixel) in the original image 602 (step 702). The method 700 identifies the local density d of region R using a larger region $S_0$ that is a superset of R (step 704), and selects parameters for the sharpening filter 604 based on the density d (step 706). Examples of such parameters include the filter shape and support. The method 700 applies the sharpening filter 604 to a region $S_1$, which is also a superset of region R, using the identified parameters, and modifies region R based on the resulting filtered image to produce a sharpened version of region R (step 708). For example, region R may be replaced with the region having the same coordinates in the filtered image produced by applying the sharpening filter 604 to region $S_1$. The method 700 repeats steps 704-708 for the remaining regions in the original image 602, thereby producing sharpened image 606 (step 710).

In such an approach, the filter parameters are functions of the local density. The local densities may be computed by low-pass filtering the image 602 with an appropriate support. Such a method suffers, however, from high computational complexity, especially if each region is a single pixel and the desired support of the sharpening and low-pass filter is large at some density levels. As will now be described in more detail, restricting the shape of the sharpening filter 604 enables a very efficient sharpening algorithm to be obtained.

Figure 7B:
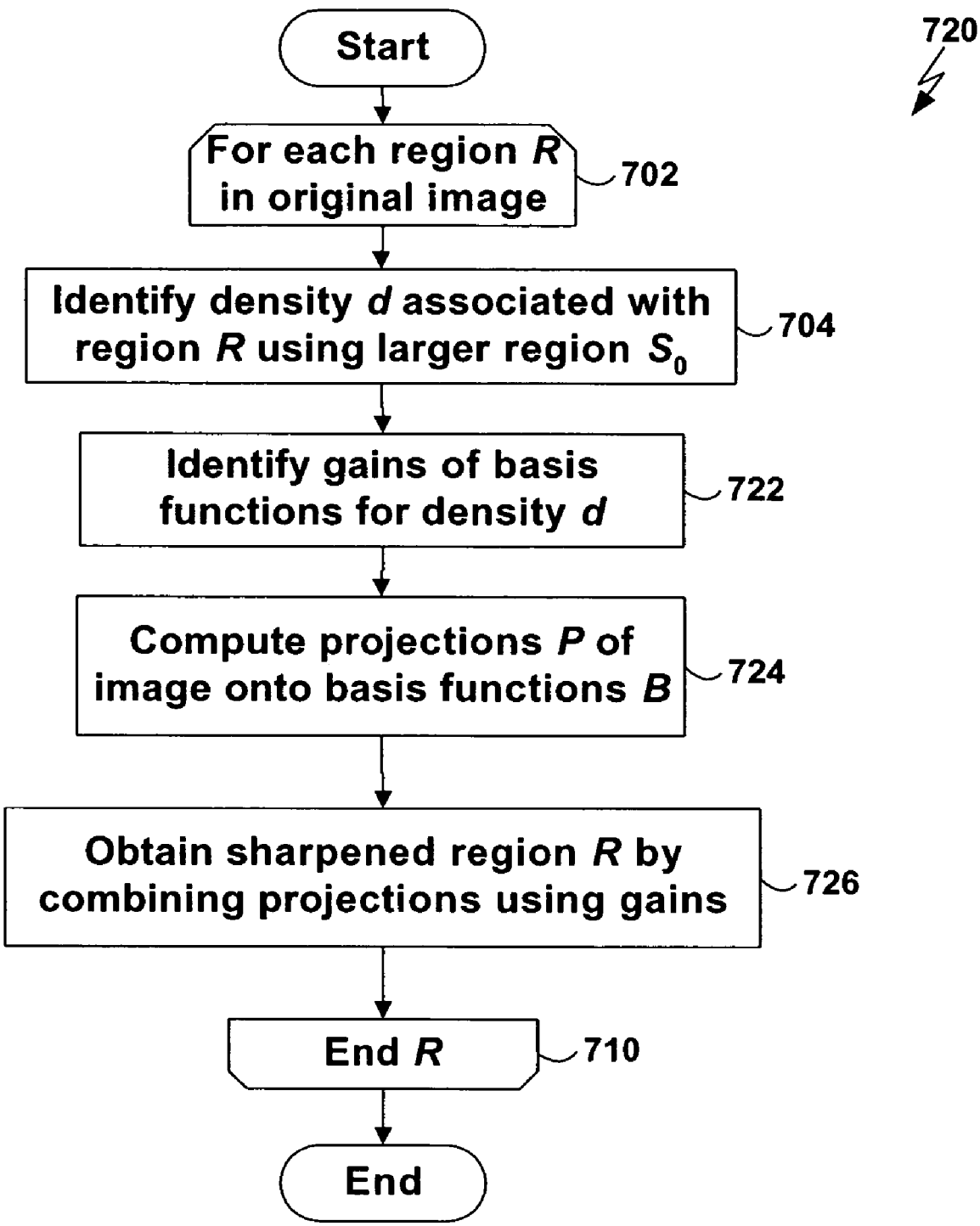
FIG. 7B is a flowchart of a method for performing density-dependent sharpening according to another embodiment of the present invention.

In one embodiment of the present invention, instead of arbitrarily choosing the shape of the sharpening filter 604 for each region, the shape of the sharpening filter 604 is restricted to lie in a space spanned by a set of basis functions B. Referring to FIG. 7B, a flowchart is shown of a method 720 that is used in one embodiment of the present invention by the system 600 to perform density or gray level-dependent sharpening using the basis functions B. Examples of techniques for generating the basis functions and associated gains will be described below with respect to FIGS. 2A-2D. Note that the basis functions B and the associated gains may be precomputed prior to the performance of the method 720 in FIG. 7B.

The method 720 enters a loop over each region R (e.g., each pixel) in the original image 602 (step 702). The method 720 identifies the local density d of region R using a larger region $S_0$ that is a superset of R (step 704). Steps 702 and 704 may be performed in the manner described above with respect to FIG. 7A.

The method 720 identifies gains of the basis functions B for density d (step 722). The method 720 computes projections P of the original image 602 onto the basis functions B (step 724). The method 720 obtains a sharpened version of the region R by combining the projections P using the identified gains (step 726). The method 700 repeats steps 704, 722, 724, and 726 for the remaining regions in the original image 602, thereby producing sharpened image 606 (step 710).

In one embodiment of the present invention, the choice of the basis functions is governed by two considerations. First, the basis functions are chosen such that there is minimal perceivable degradation from the desired sharpening filter to the one that is achievable using the basis functions. Second, there should be an efficient method to compute projections of the input image onto the chosen basis functions.

Figure 5:
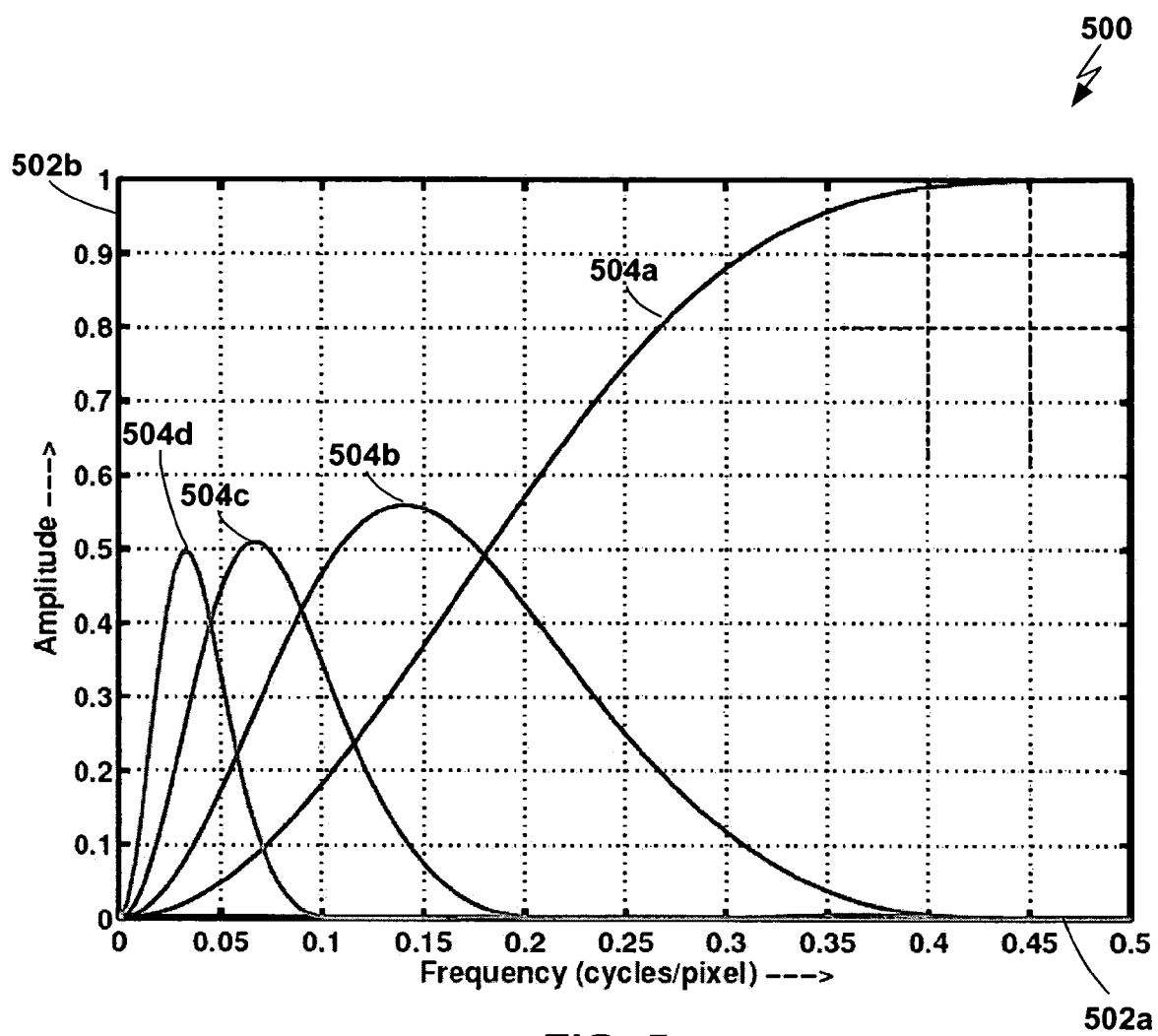
FIG. 5 is a graph of basis functions in the frequency domain for a 4-layer sharpening filter using averaging for the decimation grid shown in FIG. 3 and linear interpolation using the grid shown in FIG. 4 according to one embodiment of the present invention.

In one embodiment of the present invention, the basis functions are chosen such that the high frequency regime has low frequency resolution and the low frequency regime has high frequency resolution. Referring to FIG. 5, a graph 500 of one set of basis functions 504a-d having these properties is shown according to one embodiment of the present invention. As may be seen from FIG. 5, in which amplitude (axis 502b) is plotted against frequency (axis 502a), the basis functions 504a-d become progressively broader at increasing frequencies. Such a set of basis functions 504a-d may be generated efficiently using a recursive multi-resolution framework, as will now be described in more detail.

Figure 6B:
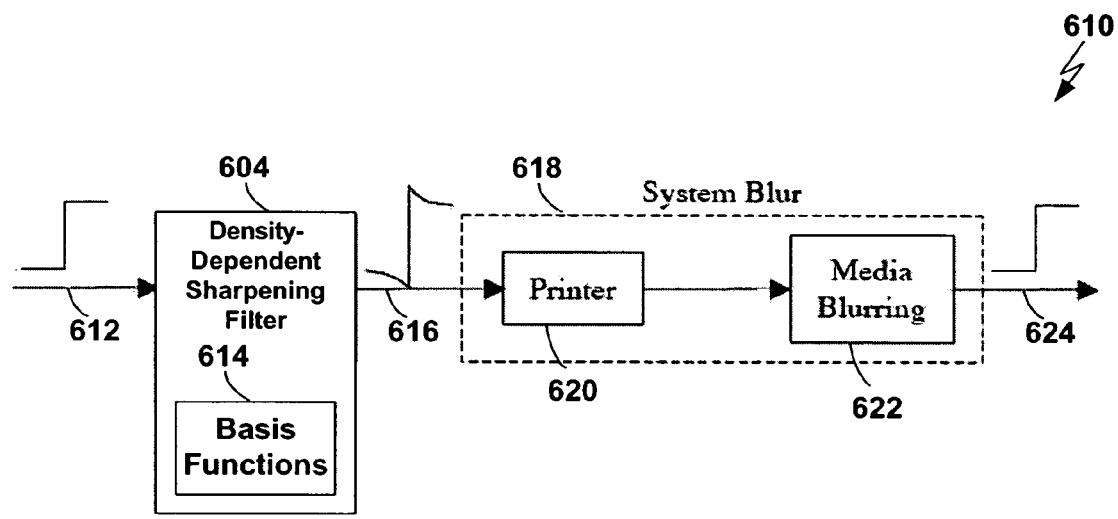
FIG. 6B is a block diagram of a system for performing density-dependent sharpening according to a second embodiment of the present invention.

Referring to FIG. 6B, a block diagram is shown of a system 610 for performing density-dependent sharpening according to one embodiment of the present invention. The system 610 includes a printer 620 for printing a digital image. Media blurring 622 is introduced into the image 612 when the printed image 624 is viewed by the human eye. In the system 610 illustrated in FIG. 6B, the sharpening filter 604 is introduced prior to the printer 620 to "pre-sharpen" an original input digital image 612. The filter 604 includes basis functions 614. The filter 604 produces a pre-sharpened image 616 that is input to the printer 620, with the intent that the resulting printed image 624 produced by the printer 620 and viewed by the human eye will be the same as the original input image 612.

Figure 2A:
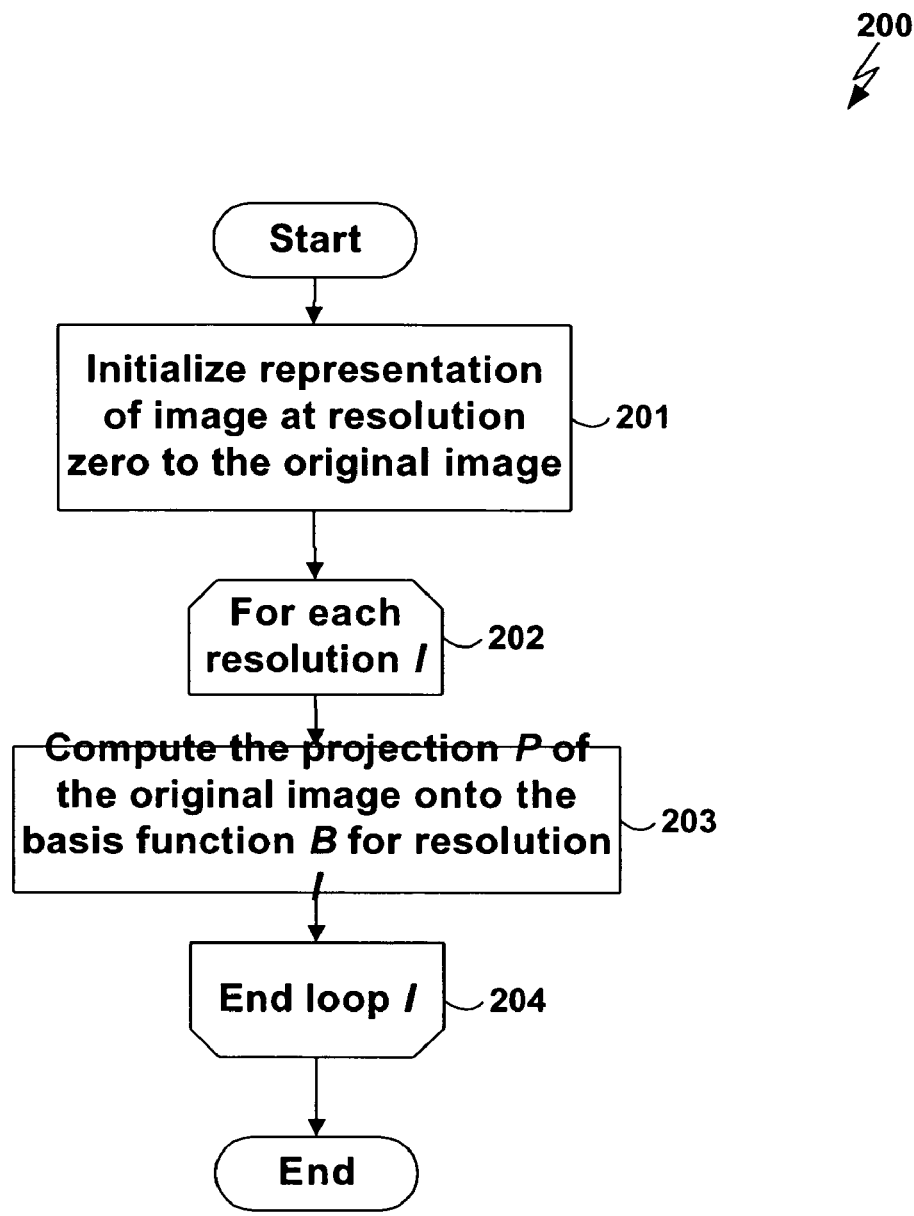
FIGS. 2A-2B are flowcharts of methods that are performed in embodiments of the present invention to compute projections of an input image onto a plurality of basis functions.
Figure 2B:
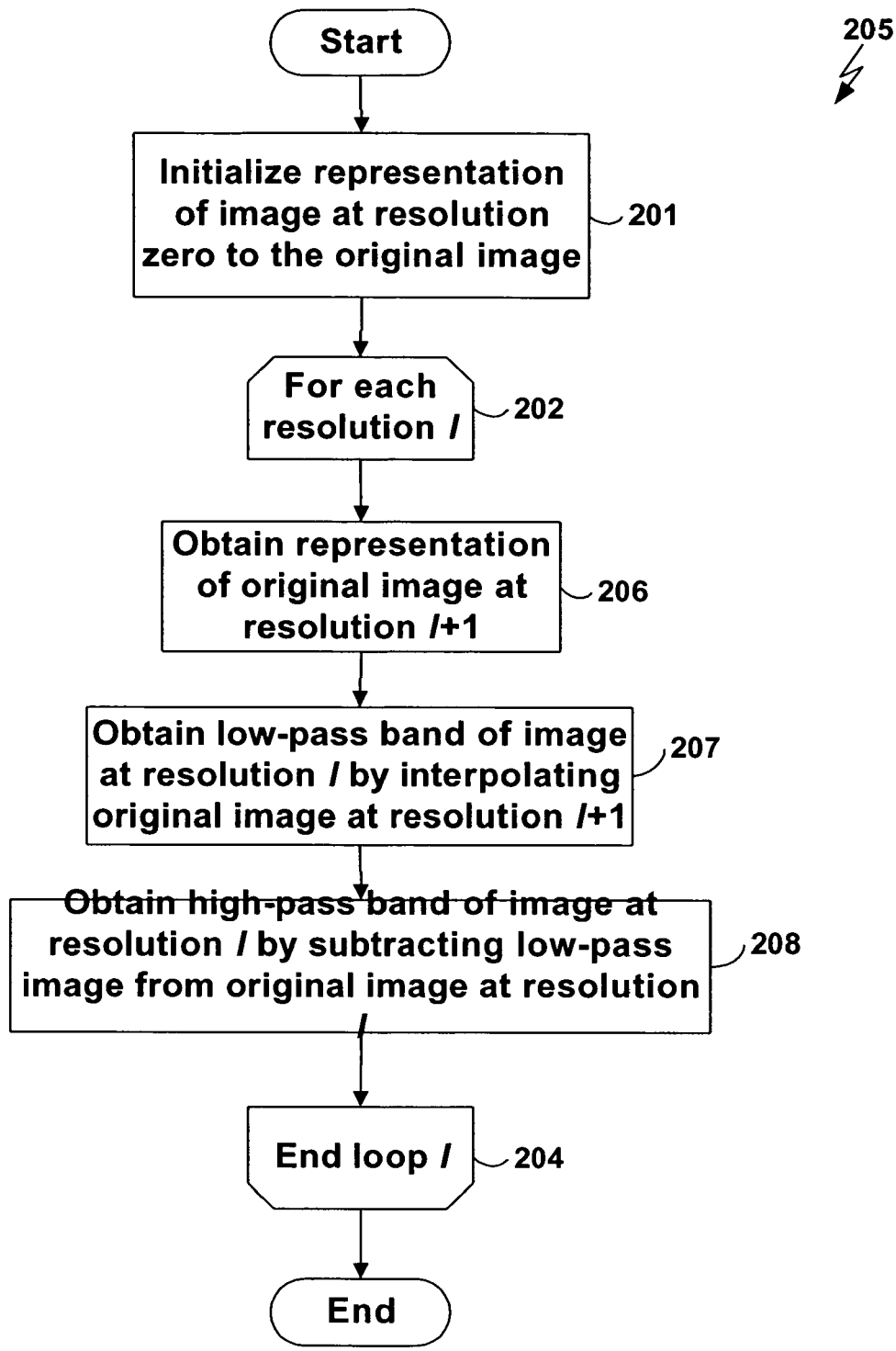

Examples of techniques for computing projections of the input image onto the basis functions 614 will now be described. Let x denote the original image 612. Let $x_s$ denote the sharpened image 616. Referring to FIG. 2A, a flowchart is shown of a method 200 that is used in one embodiment of the present invention to compute projections of the original 612 image onto the basis functions 614.

Let the superscript $^{(l)}$ denote the resolution level l of an image, where l=0 denotes the finest resolution and larger values of l denote coarser resolutions, with L denoting the coarsest resolution. For example, $x^{(l)}$ denotes the representation of the original image 602 at resolution level l. Let $I_l^k$ denote an interpolation or a decimation operator that takes an image from level l to level k. It is implicit then that $I_l^k$ is an interpolation operator when k<l. Bold-case letters will be used to denote vectors and matrices.

For each resolution, the original image at that resolution is split into two frequency bands: a high-pass band and a low-pass band. Let $x_b^{(l)}$ and $x_h^{(l)}$ denote the low-pass and high-pass image, respectively, at level l. Following the above-described notation, the coarse-resolution representation of the original image x may be obtained recursively using Equation 1 and Equation 2:

$$x^{(0)}=x \qquad \text{Equation 1}$$

$$x^{(l+1)}=I_l^{l+1}x^{(l)}, l=0, \ldots, L-1 \qquad \text{Equation 2}$$

As shown in FIG. 2A, the method 200 initializes the representation of the original image 602 at resolution level 0 to be equal to the original image 602 (step 201), as indicated by Equation 1. The method 200 enters a loop over each resolution level l (step 202). The method 200 computes the projection P of the original image 602 onto the basis function B for resolution l (step 203). The method 200 repeats step 203 for the remaining resolutions (step 204). The result of the method 200 is a plurality of projections P of the original image 602, one for each of the resolutions.

The method 200 may be implemented in any of a variety of ways. For example, referring to FIG. 2B, a flowchart is shown of a method 205 that is used in one embodiment of the present invention to compute projections of the original image 612 onto the basis functions 614, and thereby to implement the method 200 (FIG. 2A). The method 205 initializes the representation of the original image 612, as described above with respect to FIG. 2A (step 201). The method 200 enters a loop over each resolution level l (step 202). The method 200 obtains $x^{(l+1)}$, the representation of the original image 612 at resolution level l+1, such as by using Equation 2 (step 206). The low-pass image $x_b^{(l)}$ may be computed efficiently by interpolating the original image from the coarser resolution to the current resolution using Equation 3 (step 207):

$$x_b^{(l)}=I_{l+1}^l x^{(l+1)} \qquad \text{Equation 3}$$

The high-pass image $x_h^{(l)}$ may be computed using Equation 4 (step 208), thereby computing the projection P described above with respect to step 203 (FIG. 2A):

$$x_h^{(l)}=x^{(l)}-x_b^{(l)} \qquad \text{Equation 4}$$

Figure 2C:
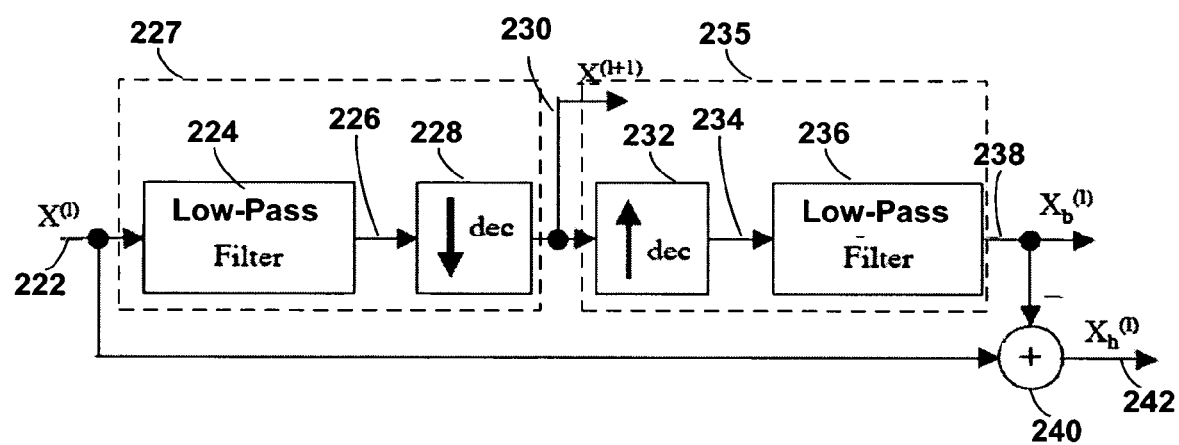
FIG. 2C is a block diagram of filtering operations performed in one layer to obtain a multi-resolution decomposition according to one embodiment of the present invention.

The method 200 may obtain low- and high-pass images at all resolution levels by repeating steps 206-208 (step 204). Referring to FIG. 2C, a block diagram is shown which represents one layer of the multi-resolution decomposition process described above with respect to Equation 1-Equation 4 (i.e., one iteration of the loop in FIG. 2B). In FIG. 2C, dec denotes the down-sampling factor.

The image $x^{(l)}$ 222 at resolution l is provided to a low-pass filter 224, which produces a low-pass image 226, which is in turn provided to a down-sampling operator 228, which produces the image $x^{(l+1)}$ 230 at layer l+1. The down-sampling operator 228 decreases the sampling rate by throwing away intermediate samples. The low-pass filter 224 and down-sampling operator 228 in combination act as a decimation filter 227 to produce an original image at resolution l+1. The image $x^{(l+1)}$ 230 represents the output of Equation 2. Note that the decomposition of the decimation filter 227 into a separate low-pass filtering operation 224 and down-sampling operation 228 is for illustrative purposes only. In practice, for the sake of efficiency, the samples that are thrown out by the down-sampling operator 228 need not be computed by the low-pass filter 224.

The image $x^{(l+1)}$ 230 is provided to an up-sampling operator 232, which introduces intermediate zero samples to increase the sampling rate of the image $x^{(l+1)}$ 230 to produce an image 234, which is in turn provided to low-pass filter 236, which produces the low-pass image $x_b^{(l)}$ 238 at resolution l. The up-sampling operator 232 and low-pass filter 236 in combination act as an interpolation filter 235. The image $x_b^{(l)}$ 238 represents the output of Equation 3. Finally, an adder 240 subtracts the low-pass image $x_b^{(l)}$ 238 from the original image $x^{(l)}$ 222 to produce the high-pass image $x_h^{(l)}$ 242 at resolution l, representing the output of Equation 4. Note that FIG. 2C may be duplicated for each layer l to produce the low-pass image $x_b^{(l)}$ and the high-pass image $x_h^{(l)}$ for each layer (i.e., for 0≦l<L).

From Equation 1, Equation 2, and Equation 3 it may be seen that the impulse response of the filter that produces the low-pass image is given as $I_{l+1}^l I_l^{l+1}\delta^{(l)}$ and that the impulse response of the filter that produces the high-pass image is given as $(1-I_{l+1}^l I_l^{l+1})\delta^{(l)}$, where $\delta^{(l)}$ is the Kronecker delta function at resolution l.

Sharpening may be achieved by gaining the high-pass image $x_h$ at each resolution (i.e., for 0≦l<L), and then reconstructing the image using the gained-up high-pass images. The set of images $\{x_h^{(l)}:l=0, \ldots, L-1\}$ corresponds to the projections of the original image 612 onto basis functions at different resolutions, and the gains that are applied to each image in this set corresponds to the coefficient (weight) associated with each basis function.

To correct for the density-dependent blurring that results from scattering, the gains are selected to be functions of the local gray level and the resolution. Let image $x_g^{(l)}$ denote the local gray level information at resolution l, and let $g(\bullet,l)$ denote a function that gives the gain as a function of gray level and resolution. Let $x_s^{(l)}$ denote the sharpened image at resolution l. The sharpened image at the finest resolution is recursively obtained from the coarsest resolution using Equation 5 and Equation 6:

$$x_s^{(L)}=x(L) \quad \text{Equation 5}$$

$$x_s^{(l)}=I_{l+1}^l x_s^{(l+1)}+(1+g(x_g^{(l)},l))\,x_h^{(l)},\ l=L-1,\ldots,0 \quad \text{Equation 6}$$

Note that $g(\bullet,\bullet)$ represents the additional contribution of the high-pass channel to the sharpened image over and above the original contribution. Therefore, when $g(\bullet,\bullet)=0$, the sharpened image 606 is equal to the original image 602. The above specification utilizes $x_g^{(l)}$ as the local gray level that modulates the gain on the high-pass component in a space-varying fashion. Consequently, the computation of the image $x_g^{(l)}$ would depend on the support of the locality that influences the blurring of the image. To retain generality, we specify this computation using Equation 7 and Equation 8:

$$x_g^{(L)}=x(L) \quad \text{Equation 7}$$

$$x_g^{(l)}=I_{l+1}^l x_g^{(l+1)}+\beta(l)\,x_h^{(l)}, l=L-1,\ldots,0 \quad \text{Equation 8}$$

In Equation 8, $\beta(l)$ specifies the attenuation on the high-pass channel. In particular, in one embodiment of the present invention, the $\beta(l)$'s are restricted such that $\beta(l) \leq \beta(l+1) \leq 1$, $\forall l$, since $x_g^{(l)}$ will typically be a low-pass version of $x^{(l)}$. Given this restriction, we have $x_g^{(l)}=x^{(l)}$ if $\beta(l)=1$ and some savings in computation can be realized by not computing $x^{g(l)}$ at these resolution levels. Another extreme case is $\beta(l)=0$ for all l. In this case, the high pass channel makes no contribution to the interpolated image and $x_g$ at any resolution is given as the interpolated version of the original image at the coarsest resolution, as shown in Equation 9.

$$x_g^{(l)}=I_L^l x_g^L, l=L-1,\ldots,0 \quad \text{Equation 9}$$

Figure 2D:
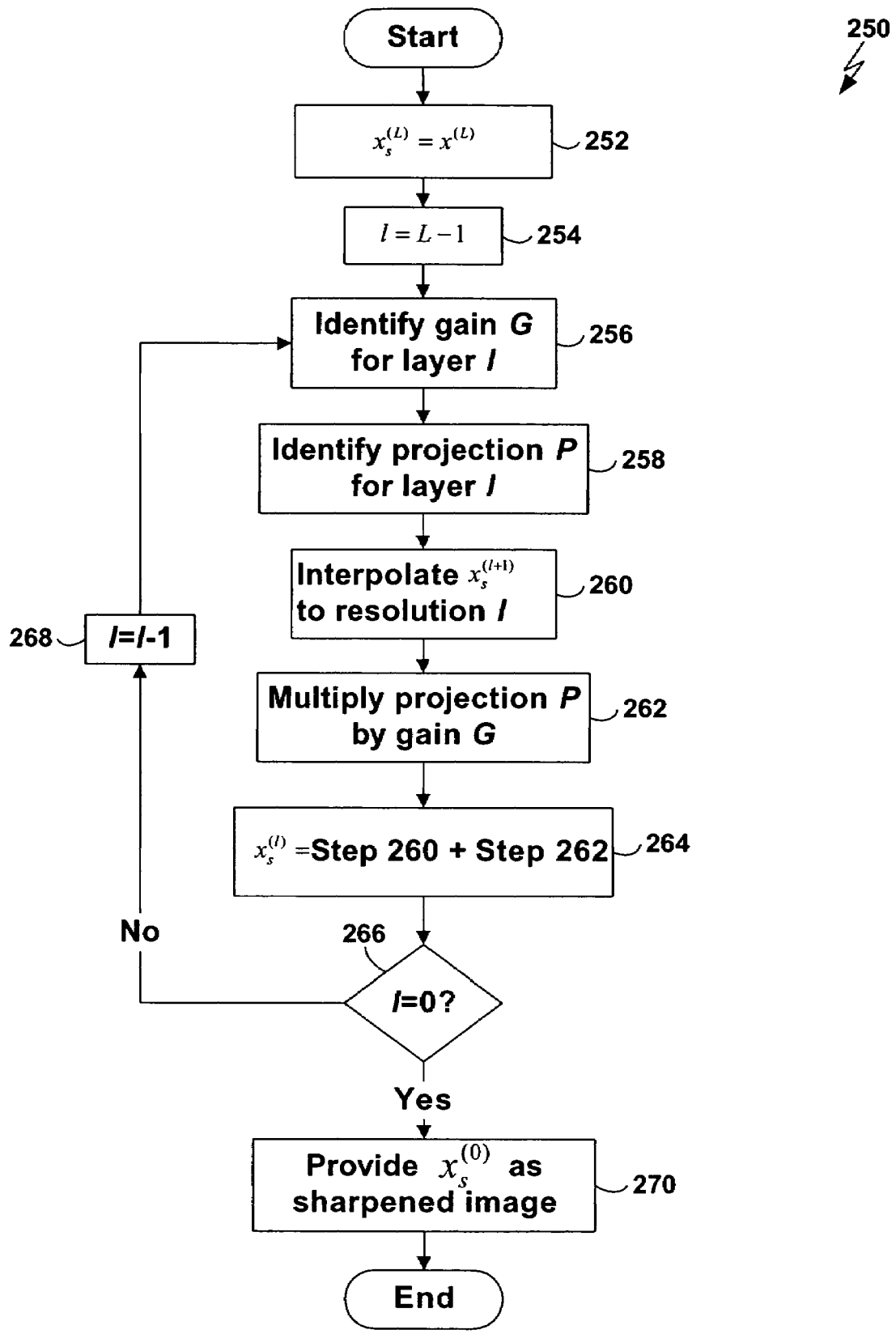
FIG. 2D is a flowchart of a method for generating a sharpened version of an input image according to one embodiment of the present invention.

The techniques described above for generating the sharpened image $x_s^{(0)}$ are illustrated in the flowchart shown in FIG. 2D. The method 250 shown in FIG. 2D initializes the sharpened image $x_s^{(l)}$ at the coarsest resolution L to be the same as the original image $x^{(L)}$ at resolution L (step 252). The method 250 sets the value of l to be equal to L−1 (step 254).

The method 250 identifies the gain image G to be applied to resolution l (step 256), such as by applying Equation 8 to identify $x_g^{(l)}$ and then identifying the gain image G as $(1+g(x_g^{(l)},l))$. The method 250 identifies the projection P to apply to resolution l (step 258). As described above, the high-pass image $x_h^{(l)}$ may be used as the projection of the original image onto the basis function B, in which case step 258 may be implemented using Equation 4.

The method 250 interpolates the sharpened image from resolution l+1 to resolution l (step 260). The method 250 multiplies the projection P by the gain G to obtain PG (step 262). The method 240 adds the results of steps 260 and 262 to obtain $x_s^{(l)}$, the sharpened image at resolution l (step 264).

If the value of l is not zero (step 266), then the method 250 is not finished generating the final sharpened image 606, and then method 250 decrements l (step 268) and repeats steps 256-264 for the new value of l. When l reaches zero, the sharpened image at resolution l=0 ($x_s^{(0)}$) is provided as the final sharpened image 606 (step 270).

Note that the above density-dependent sharpening scheme has been described with respect to the particular multi-resolution decomposition scheme described above with respect to Equation 1-Equation 4. However, other multi-resolution methods that decompose an image into sub-bands (low- and high-pass), such as wavelets, can also be used.

Figure 3:
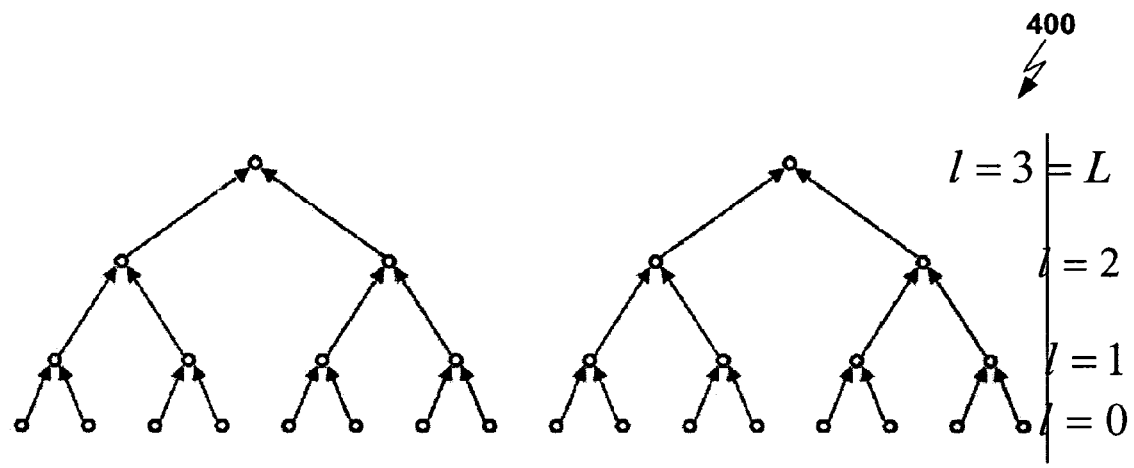
FIG. 3 is a diagram of a pixel grid and data flow map for decimating an image signal from the finest resolution to the coarsest resolution that results in the minimum amount of computation according to one embodiment of the present invention.
Figure 4:
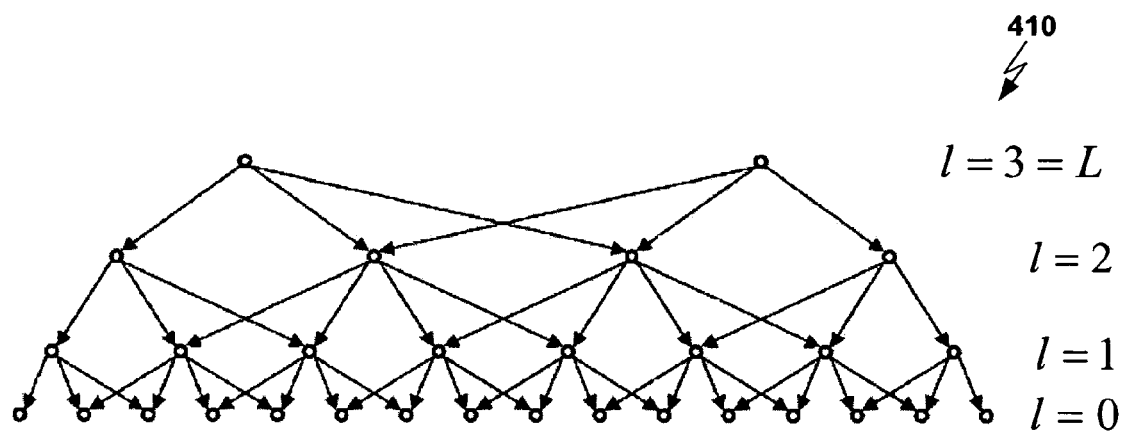
FIG. 4 is a diagram of a dataflow map for interpolating an image signal from the coarsest resolution to the finest resolution according to one embodiment of the present invention.

The support of the decimation/interpolation filters 224 and 236 and the choice of the down-sampling factor 228 determines the decimation/interpolation inter-pixel dependencies. Referring to FIG. 3, a pixel grid and data flow map 400 is shown for a factor of 2 decimation operation that has the minimum computation. As shown in FIG. 3, there are four layers, for $0 \leq l \leq L$, where L=3. The parent nodes are obtained by averaging the child nodes, and there is no overlap between the children of adjacent parent nodes. Although other choices with overlapping child nodes are also possible, the present discussion will refer to the decimation map 400 shown in FIG. 3 to maintain low computational complexity. The same dependency map 400 may also be used for interpolation purposes, but in this case one would need to employ nearest-neighbor interpolation, resulting in undesirable blocking artifacts in the image. The next-best alternative from a minimal computation point of view is to choose linear interpolation with a data flow map 410, as shown in FIG. 4.

Note that performing the density-dependent sharpening algorithm in the embodiments described above involves the storage of two additional images at the different resolution levels, namely the gain image $x_g$ and the sharpened image $x_s$. It may be difficult to provide such storage, especially in an embedded environment. Therefore, instead of performing multi-resolution decomposition into the basis functions and subsequent sharpening on the entire source image 612 as a whole, those of ordinary skill in the art will understand how to perform decimation and interpolation on portions of the image 612 in a blockwise fashion, thereby reducing the memory requirements of the sharpening filter 604.

As may be seen from Equation 6 and as described above with respect to FIG. 2D, the sharpened image 606 is constructed by modulating and summing the high-pass images at the different layers. The high-pass channels therefore form a basis for the sharpened image $x_s$. Note that the original image at the coarsest resolution L (i.e., $x^{(L)}$) is also a basis function, but since it is not modulated, we focus only on the high-pass channels.

Figure 2E:
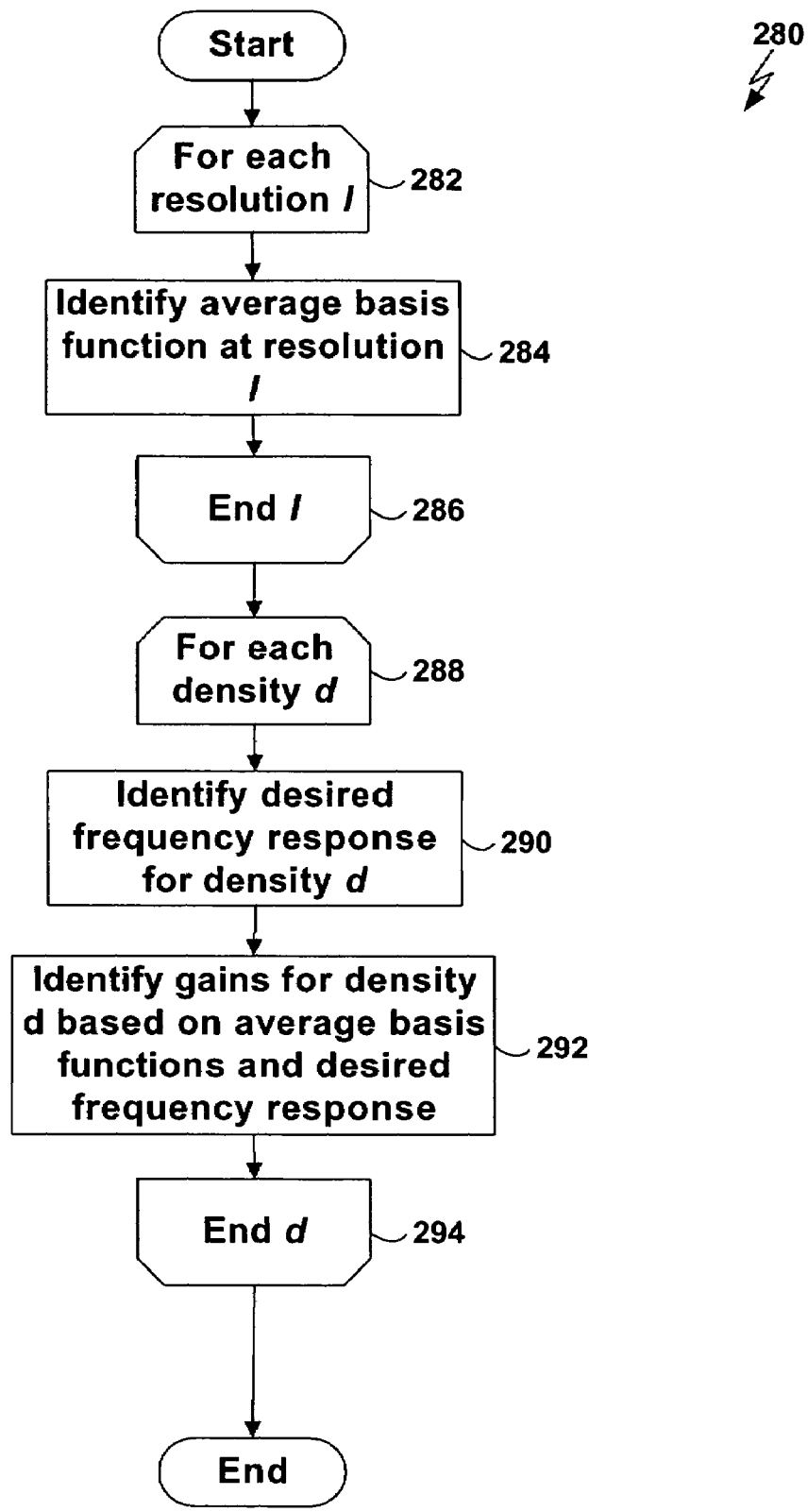
FIG. 2E is a flowchart of a method for estimating a gain function for use in sharpening an input image in one embodiment of the present invention.

As noted above, the gain function g(d,l) in Equation 6 is a function of both density and the resolution layer. It was stated above with respect to step 256 of the method 250 shown in FIG. 2D that the gain G for a layer l may be identified. Examples of techniques for estimating the gain function g(d,l) will now be described. Once the gain function g(d,l) has been estimated, it may be used, for example, to implement step 256 in the manner described above. Referring to FIG. 2E, a flowchart is shown of a method 280 for estimating the gain function g(d,l) in one embodiment of the present invention.

The high-pass response at the finest resolution (l=0) of the different layers to an impulse at the finest resolution is given by Equation 10:

$$h_{ln}=I_l^0(1-I_{l+1}^l I_l^{l+1})I_0^l \delta_n^{(0)} \quad \text{Equation 10}$$

In Equation 10, n denotes the spatial position of the impulse. Note that the impulse response of the different layers is not shift-invariant; hence the need to include the spatial position of the input impulse in the notation for the impulse response. It can be shown that the number of unique phases for the impulse response of layer l is $dec^{l+1}$, where dec is the down-sampling factor 218. This non-uniqueness of the basis function poses a problem for determining the modulation coefficients or gain values of each layer. Since natural images would have edges at all possible positions, in one embodiment of the present invention, all of the $dec^{l+1}$ impulse responses of layer l are averaged to obtain the basis function for that layer.

Let $H_{ln}$ denote the Fourier transform of $h_{ln}$. Then the average basis function $H_1$ in the frequency domain is given by Equation 11:

$$H_l(f) = \sum_{n=0}^{dec^{l+1}-1} e^{j2\pi nf} H_{ln}(f) \qquad \text{Equation 11}$$

In Equation 11, $e^{j2\pi nf}$ is a factor that spatially aligns all the different phases of the impulse response. Note that $H_{ln}$ may be complex if the impulse response for phase n is asymmetric. However, the average response is always symmetric and therefore $H_l(\bullet)$ is real.

Referring again to FIG. 2E, the method 280 enters a loop over each resolution l (step 282) and identifies the average basis function $H_l$ using, for example, Equation 11 (step 284). The method 280 repeats step 284 for each layer l (step 286). Let H denote a matrix whose columns are the high-pass basis functions computed at a discrete set of frequencies by this repeated application of Equation 11.

Referring to FIG. 5, the basis functions 504a-d for a 4-layer decomposition are shown where the decimation factor 218 is chosen to be 2 and linear interpolation and averaging are employed for interpolation and decimation operations, respectively. Note how the frequency resolution of the basis function increases as the spatial resolution of the layer decreases (along axis 502a).

Let S(f,d) be the frequency response of the desired sharpening filter at print density d. Let S(d) denote a column vector of the desired frequency response at a discrete set of frequencies. Referring again to FIG. 2E, the method 280 enters a loop over each density d (step 288) and identifies the desired frequency response at density d (step 290).

Then the coefficient of the basis functions (layer gains g(d,l)) that minimize the error between the desired response and the actual response in a mean square sense is given by Equation 12:

$$g(d,\bullet) = (H^T H)^{-1} H^T (S(d)-1) \qquad \text{Equation 12}$$

In Equation 12, $g(d,\bullet)$ denotes a column vector containing the gains for each layer at print density d, and 1 denotes a column vector of all ones. We use (S(d)−1) instead of S(d) in the least squares fit because, as previously noted, $g(d,\bullet)$ represents the additional contribution of the high-pass channel in the sharpened image over and above the original contribution.

The method 280 identifies the gains $g(d,\bullet)$ for density d based on the average basis functions H and the desired frequency response S(d) using, for example, Equation 12 (step 292). The method 280 repeats steps 290-292 for the remaining densities and thereby identifies the corresponding gains (step 294).

The desired frequency response S(f,d) is typically estimated from print samples and may suffer from high noise because of an inversion that needs to be performed as discussed in more detailed below. To obtain robust estimates of the layer gains in the presence of such noise, it is desirable to do a weighted least square fit. Since we are interested in the perceived sharpness of the printed image 624, in one embodiment of the present invention we choose the contrast sensitivity function of the eye as the weighting function in the frequency domain. Let E denote a diagonal matrix containing the frequency response of the contrast sensitivity function. Then the layer gains are obtain using Equation 13:

$$g(d,\bullet) = (H^T E H)^{-1} H^T E(S(d)-1) \qquad \text{Equation 13}$$

Figure 2F:
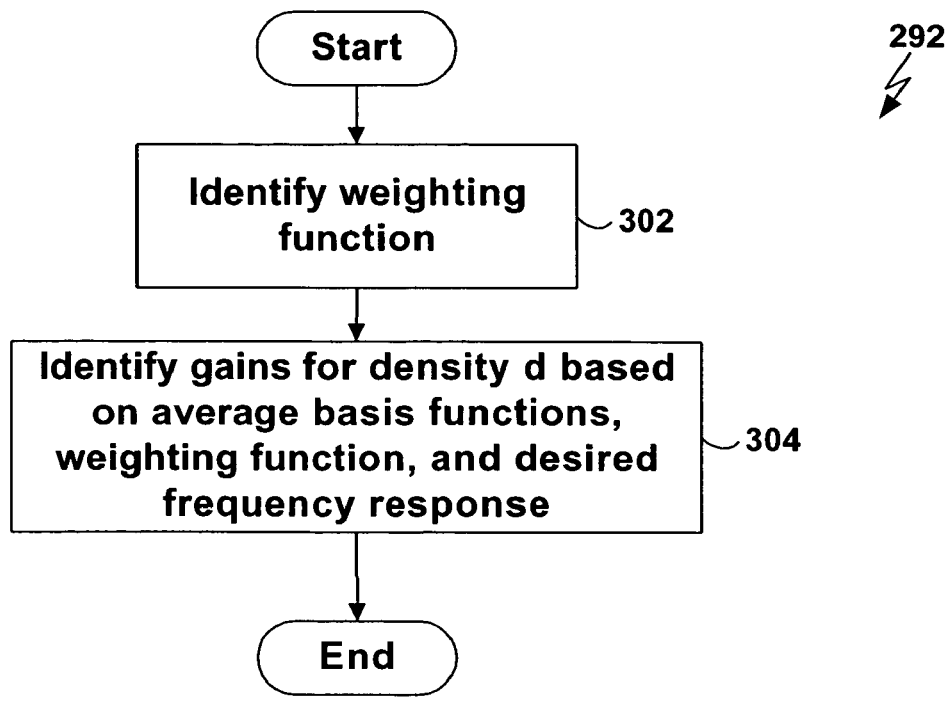
FIG. 2F is a flowchart of a method for identifying gains for use in sharpening an input image in one embodiment of the present invention.

This technique may be incorporated into the method 280 (FIG. 2E) in the manner shown in FIG. 2F. Step 292 of method 280 may include a step of identifying a weighting function (such as E) (step 302) and then identifying the gains for density d based on the average basis functions H, the weighting function E, and the desired frequency response S(d) using Equation 13 (step 304).

It is desirable to enforce $g(\bullet,\bullet) \geq 0$ to ensure that we sharpen with respect to the original image 602. It is possible that Equation 13 may yield negative values for the gains of some layers for some desired response. In one embodiment of the present invention, when negative gains are obtained, the basis functions which result in such negative gains are eliminated (e.g., by eliminating the columns of such basis functions from the matrix H). The weighted least squares fit is then redone, using only the remaining basis functions. The gains of the eliminated basis functions are then set to zero.

Figure 2G:
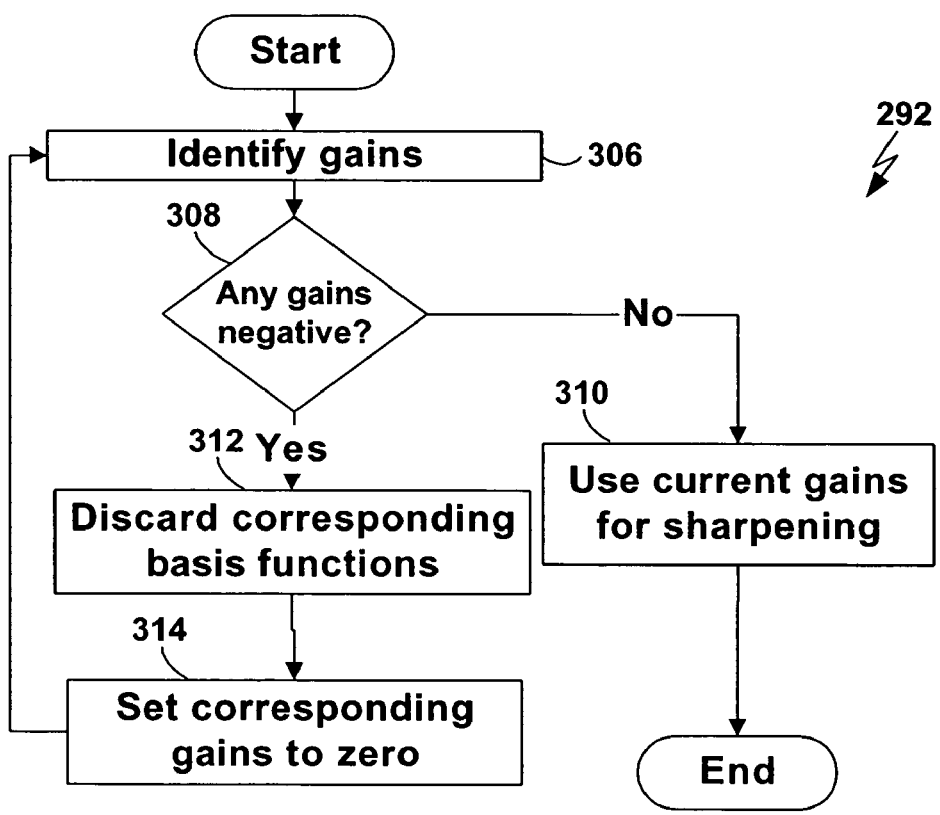
FIG. 2G is a flowchart of a method for identifying gains for use in sharpening an input image in another embodiment of the present invention.

This technique may be applied, for example, by implementing step 292 of method 280 (FIG. 2E) in the manner illustrated in FIG. 2G. An initial set of gains $g(d,\bullet)$ is identified using, for example, Equation 12 (step 306). If none of the gains identified in step 306 is negative (step 308), the identified gains are retained for subsequent use in the sharpening filter 604 (step 310). If any of the gains is negative, the basis functions corresponding to such negative gains are discarded (step 312), the corresponding gains are set to zero (step 314), and the gains for the remaining basis functions are recomputed (step 306). Steps 306, 308, 312, and 314 may be repeated as necessary to produce all non-negative gains.

Referring again to FIG. 6B, the entire sharpening system 610 is shown according to one embodiment of the present invention. As seen in FIG. 6B, the density-dependent sharpening filter 604 precedes the printer 620 and the subsequent media blurring 622. In such a system, the density-dependent sharpening filter 604 sharpens the input image 612 to produce pre-sharpened image 616, such that when operated upon by the system blur 618 (i.e., the combination of the media blur 622 and any blurring introduced by the printer 620), the original image 612 is reproduced in the printed image 624.

To estimate the response of the sharpening filter 604, we need the input and output step-edge to the filter 604 as shown in FIG. 6B for all mean edge densities. However, the output pre-sharpened edge 616 that results in a perfect printed step-edge 624 is not readily available. A time-consuming trial-and-error method may be employed to identify this pre-sharpened edge 616.

Figure 6C:
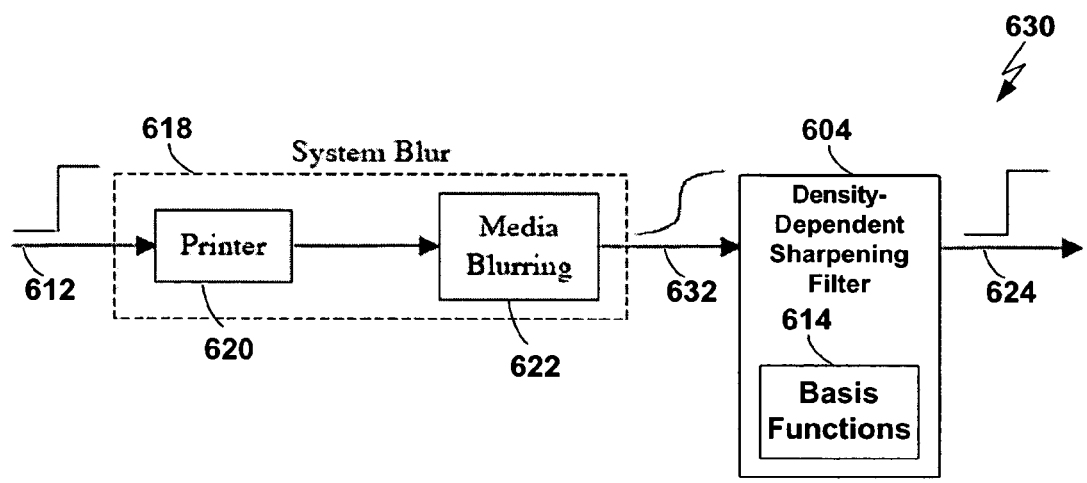
FIG. 6C is a block diagram of a system for estimating the desired frequency response of the density-dependent sharpening filter according to a third embodiment of the present invention.

Alternatively, in one embodiment of the present invention, the order of the density-dependent sharpening filter 604 and the system blur 618 are swapped, as shown in the system 630 of FIG. 6C. In the system 630, the system blur 618 produces a blurred image 632, which is sharpened by the density-dependent sharpening filter 604 to produce the (sharpened) printed image 624. Note that the system 630 shown in FIG. 6C is equivalent to the system 610 shown in FIG. 6B if the system blur 618 and density-dependent filter 604 are linear systems. If they are not linear systems, the swap is valid so long as the system blur 618 and density-dependent filter 604 are locally linear. The advantage of the embodiment illustrated in FIG. 6C is that the input and output of the density-dependent sharpening filter 604 are readily available, so that the desired frequency response of the filter 604 can be easily computed.

Figure 2H:
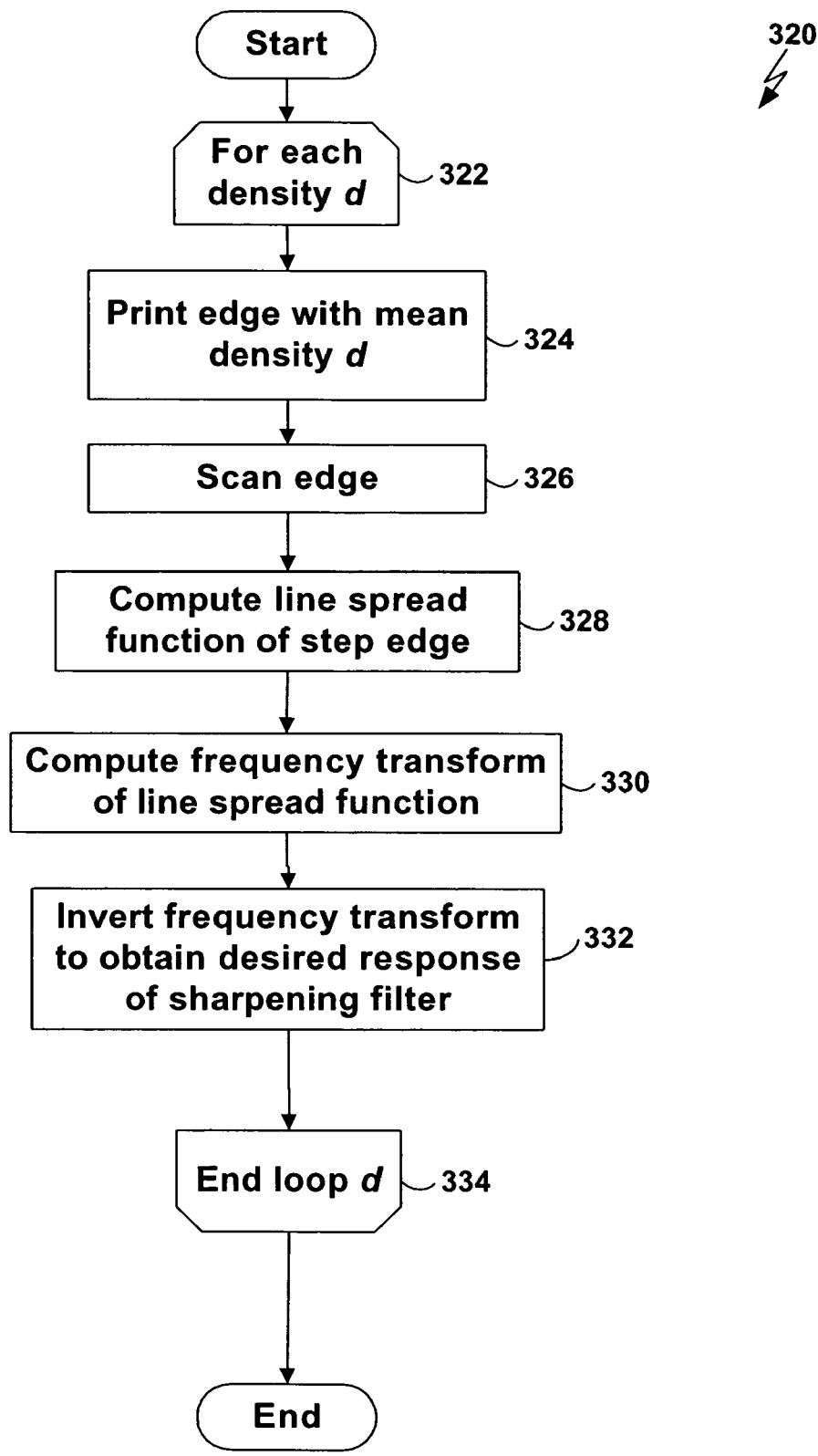
FIG. 2H is a flowchart of a method that is performed in one embodiment of the present invention to estimate a desired sharpening response of a sharpening filter.

Referring to FIG. 2H, a flowchart is shown of a method 320 that is performed in one embodiment of the present invention to estimate the desired sharpening response. The method 320 enters a loop over each density d in the density range of the printer 620 (step 322). A step-edge with mean density d is printed (step 324), and the step-edge is scanned (step 326). The amplitudes of the step-edges may be selected to be small to ensure that the entire system 630 can be approximated as a linear system for these edges. If the amplitude of a step-edge is large, the two halves of the edge may be treated independently, since the response on the two ends will be different, given the large density variation.

The line spread function of the step-edge is computed (step 328), and the frequency transform of the line spread function is taken (step 330). The result represents the frequency response of the printer/media system 630. To obtain the desired response of the density-dependent sharpening filter 604 for density d, the frequency response of the printer/media system 630 is inverted (step 332). Steps 324-332 may be repeated for each density d to obtain the desired response at each density.

Figure 8A:
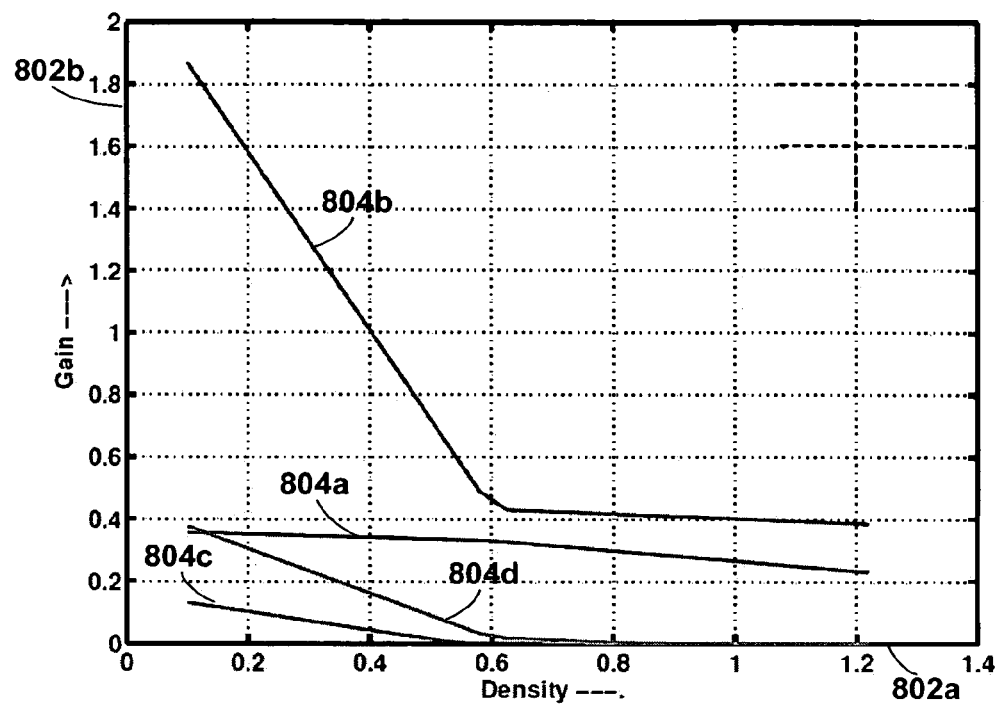
FIG. 8A is a graph of estimated gains for the high-frequency channel of each layer as a function of density according to one embodiment of the present invention.
Figure 8B:
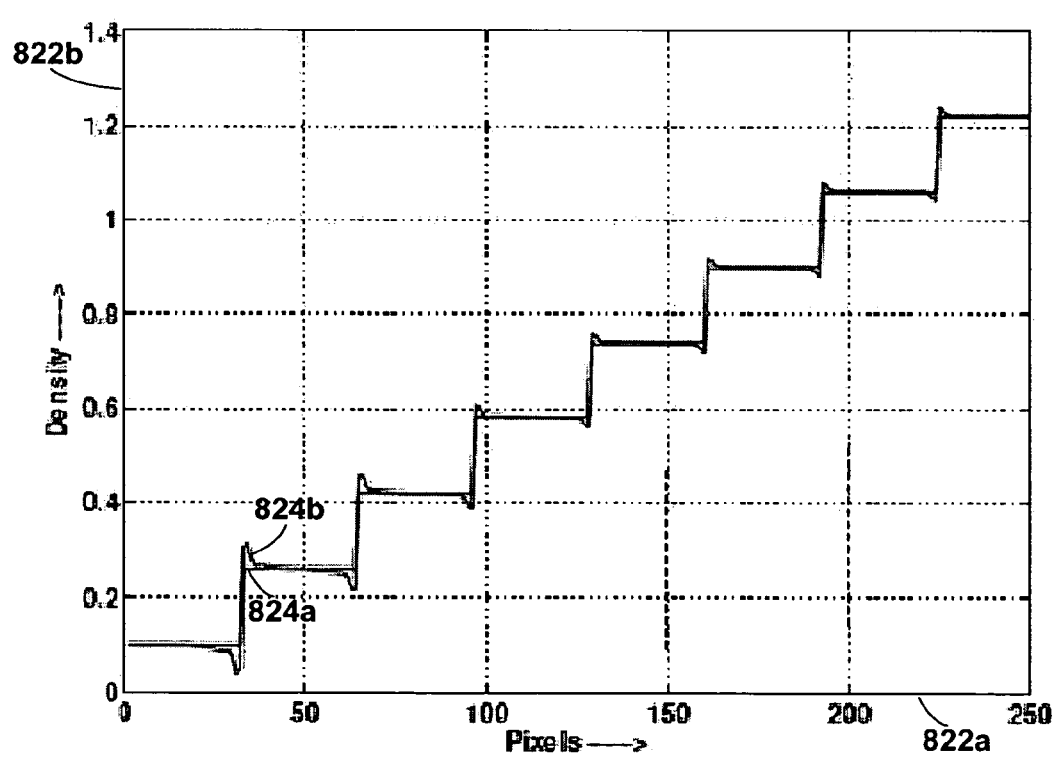
FIG. 8B is a graph showing a number of step-edges spanning the entire density range processed with a density-dependent sharpening algorithm using the layer gains shown in FIG. 8A according to one embodiment of the present invention.

The inversion process performed in step 332 is susceptible to noise amplification and a robust estimation technique for estimating the layer gains is described above with respect to Equation 10-Equation 13. Using Equation 13 we can estimate the layer gains as a function of mean edge density. FIG. 8A shows the estimated layer gain. The layer with the largest gain depends on the print dpi and the viewing distance of the print. For the example illustrated in FIG. 8A, the print dpi was 300 and the viewing distance was assumed to be 18 inches. In this case, layer 1 has the largest gain since the layer's frequency response coincides with the peak in the contrast sensitivity function of the eye. If the eye weighting is not employed, the finest resolution layer 0 has a very large gain due to the large high-frequency noise present in the estimate of S(d). However, with the eye weighting, the gain for layer 0 is reasonable, as seen in FIG. 8A. Also note that the upper layers are only employed at low densities and disappear at the higher densities. This would make the sharpening filter support vary from approximately 32 pixels at the low density end to approximately 8 pixels at the high density end. This effect is clearly seen in FIG. 8B, which shows a number of step edges at various density levels processed using the density-dependent sharpening algorithm using the gains shown in FIG. 8A.

Referring again to FIG. 9, graph 900 compares the sharpness of the printed edges in a printer/media system with no density-dependent sharpening (curve 904a) to the system shown in FIG. 6C, in which the density-dependent filter 604 acts as an inverse system to the printer/media blurring 618 (curve 904b). As seen in the SQF plots 904a-b, the density-dependent sharpening filter 604 effectively flattens the SQF, making it independent of the print density. There is a gain of 35 SQF units at the low density and a gain of 18 SQF units at the high density end.

Figure 9:
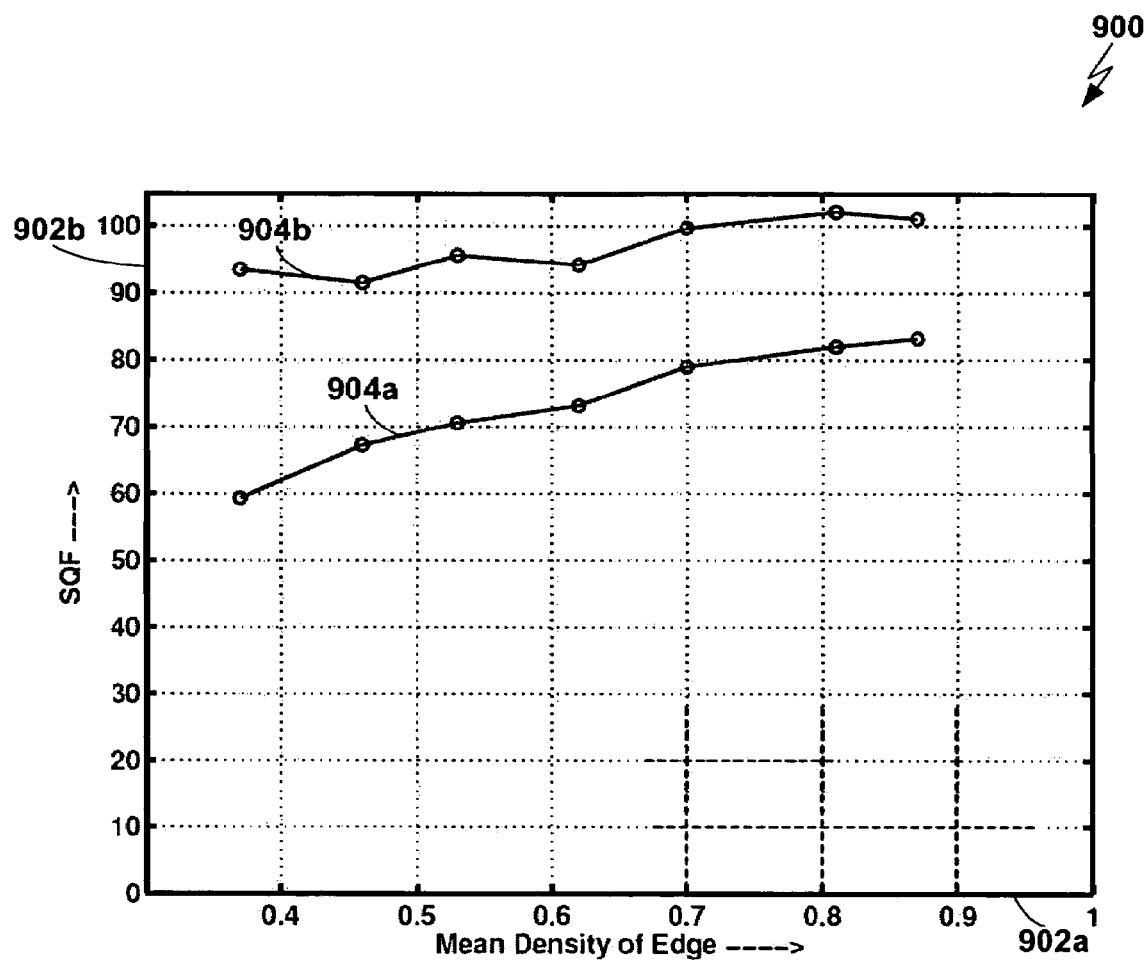
FIG. 9 is a graph showing the SQF of a prior art system and a density-dependent sharpening system according to one embodiment of the present invention.

Embodiments of the present invention have a variety of advantages including, but not limited to, the following. In general, embodiments of the present invention enable sharpening to be performed in a manner that is density-dependent, with more sharpening being performed for densities in which more blurring occurs. Typically, lower densities are more susceptible to blurring than higher densities. As shown in FIG. 9, embodiments of the present invention may be applied to perform more sharpening in regions of lower density than in regions of higher density. As a result, the techniques disclosed herein may apply a variable degree of sharpening within a single image in a manner that is tailored to the amount of blurring. The techniques disclosed herein may therefore obtain sharpening where and to the extent that it is necessary, without obtaining the detriments of sharpening where sharpening is not necessary.

Another advantage of embodiments of the present invention is that the use of the multi-resolution framework enables sharpening to be performed with a high degree of computational efficiency. As described above, the source image is decomposed into multiple images at multiple resolutions. Filtering the lower-resolution images is significantly less computationally intensive than performing filtering on the entire image. Performing filtering on these lower-resolution images and recombining them produces high-quality sharpening without incurring the computational cost that would be incurred by filtering the entire image using conventional techniques.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Figure 1:
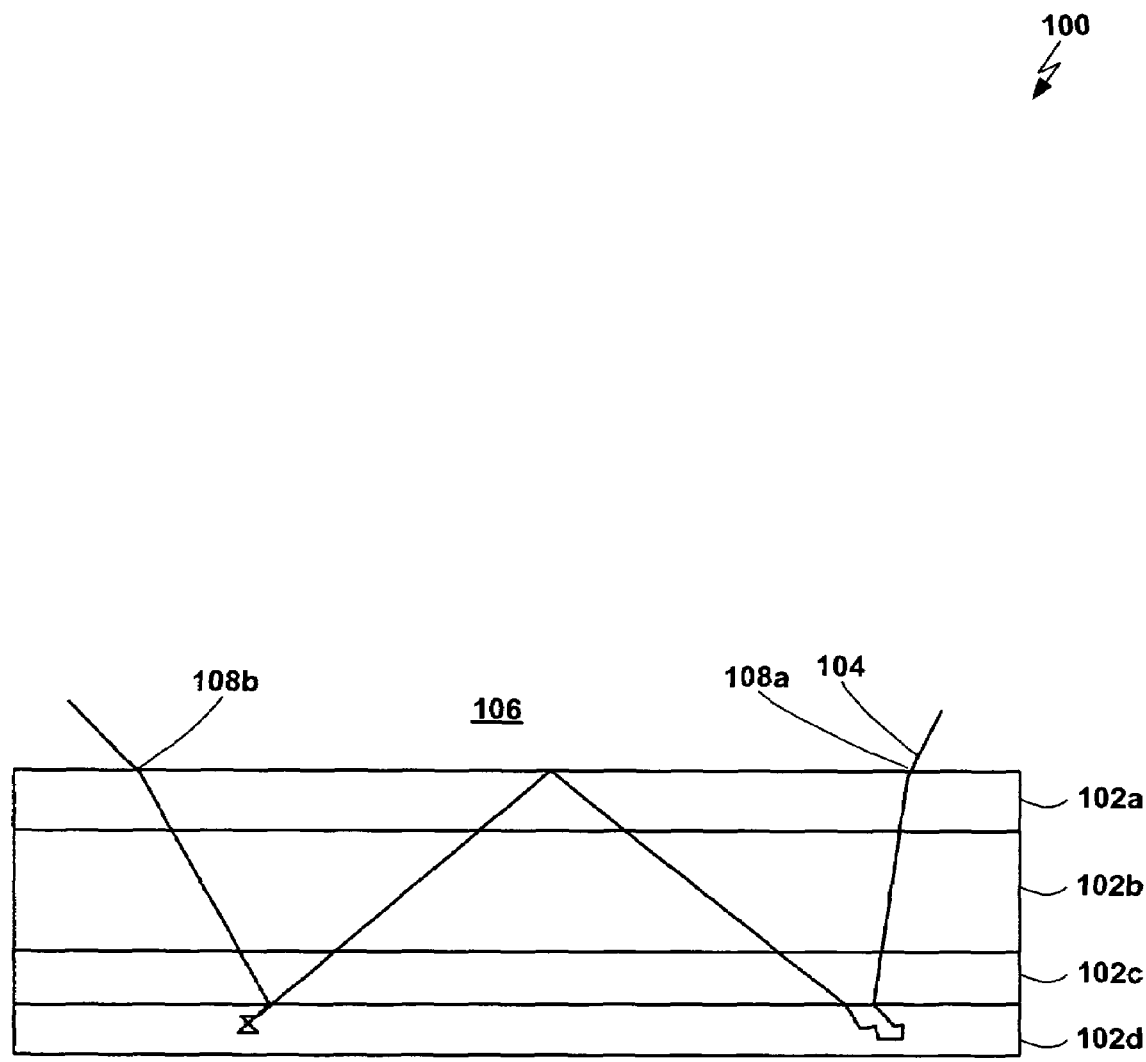
FIG. 1 is a schematic diagram of a multi-layer print medium and a path traced by a ray of light that is scattered by a TiO$_2$ layer and suffers a total internal reflection before exiting the medium.

Although certain embodiments of the present invention are described in conjunction with the media 100 shown in FIG. 1, the techniques disclosed herein are not limited to use in conjunction with the media 100. Rather, the techniques disclosed herein may be used in conjunction with media having any number of layers and any combination of colors. The imaging layer(s) may be located anywhere within the structure of the media.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method for processing a source image, the method comprising steps of:
   (A) identifying a first portion of the source image having a first density $d_0$;
   (B) identifying a first gain $g_0$ based on the first density $d_0$;
   (C) applying a sharpening filter with the first gain $g_0$ to produce a first portion of a sharpened image;
   (D) identifying a second portion of the source image having a second density $d_1$ that differs from the first density $d_0$;
   (E) identifying a second gain $g_1$ based on the second density $d_1$, wherein the second gain $g_1$ differs from the first gain $g_0$; and
   (F) applying the sharpening filter with the second gain $g_1$ to produce a second portion of the sharpened image.

2. The method of claim 1, further comprising steps of:
   (G) prior to step (C), identifying a first support $s_0$ based on the first density $d_0$; and
   (H) prior to step (F), identifying a second support $s_1$ based on the second density $d_1$;
   wherein step (C) comprises a step of applying the sharpening filter with the first gain $g_0$ and the first support $s_0$ to produce the first portion of the sharpened image; and
   wherein step (F) comprises a step of applying the sharpening filter with the second gain $g_1$ and the second support $s_1$ to produce the second portion of the sharpened image.

3. The method of claim 1, wherein the step (B) comprises a step of:
   (B)(1) identifying gains of a plurality of basis functions for the first density $d_0$; and
   wherein the step (C) comprises steps of:
   (C)(1) computing projections of the source image onto the plurality of basis functions; and
   (C)(2) producing the first portion of the sharpened image by combining the projections using the gains.

4. A device for processing a source image, the device comprising:
   first identification means for identifying a first portion of the source image having a first density $d_0$;
   second identification means for identifying a first gain $g_0$ based on the first density $d_0$;
   first application means for applying a sharpening filter with the first gain $g_0$ to produce a first portion of a sharpened image;
   third identification means for identifying a second portion of the source image having a second density $d_1$ that differs from the first density $d_0$;
   fourth identification means for identifying a second gain $g_1$ based on the second density $d_1$, wherein the second gain $g_1$ differs from the first gain $g_0$; and
   second application means for applying the sharpening filter with the second gain $g_1$ to produce a second portion of the sharpened image.

5. The device of claim 4, further comprising:
   means for identifying a first support $s_0$ based on the first density $d_0$; and
   means for identifying a second support $s_1$ based on the second density $d_1$;
   wherein the first application means comprises means for applying the sharpening filter with the first gain $g_0$ and the first support $s_0$ to produce the first portion of the sharpened image; and
   wherein the second application means comprises means for applying the sharpening filter with the second gain $g_1$ and the second support $s_1$ to produce the second portion of the sharpened image.

6. The device of claim 4, wherein the second identification means comprises:
   means for identifying gains of a plurality of basis functions for the first density $d_0$; and
   wherein the first application means comprises:
   means for computing projections of the source image onto the plurality of basis functions; and
   means for producing the first portion of the sharpened image by combining the projections using the gains.

7. A method for processing a source image, the method comprising steps of:
   (A) initializing a sharpened version of the source image;
   (B) for each of a plurality of resolutions l, performing steps of:
   (1) identifying a gain G associated with resolution l;
   (2) identifying a projection P of the source image onto a basis function B associated with resolution l;
   (3) updating the sharpened version of the source image at resolution l based on the gain G and the projection P; and
   (C) providing the updated sharpened version of the source image as a final sharpened version of the source image.

8. The method of claim 7, wherein the step (B)(2) comprises steps of:
   (B)(2)(a) obtaining a representation of the source image at resolution l;
   (B)(2)(b) obtaining a low-pass band of the source image at resolution l; and
   (B)(2)(c) obtaining a high-pass band of the source image at resolution l based on the representation of the source image at resolution l and the low-pass band of the source image at resolution l.

9. The method of claim 8, wherein the step (B)(2)(a) comprises steps of:
   (B)(2)(a)(i) low-pass filtering the source image to produce a low-pass image; and
   (B)(2)(a)(ii) down-sampling the low-pass image to produce the representation of the source image at resolution l.

10. The method of claim 9, wherein the step (B)(2)(b) comprises steps of:
    (B)(2)(b)(i) up-sampling the representation of the source image at resolution l to produce up-sampled image; and
    (B)(2)(b)(ii) low-pass filtering the up-sampled image to produce the low-pass band of the source image at resolution l.

11. The method of claim 10, wherein the step (B)(2)(c) comprises a step of subtracting the low-pass band from the source image to produce the high-pass band.

12. The method of claim 7, wherein step (B)(3) comprises steps of:
(B)(3)(a) multiplying the projection P by the gain G to produce a product; and
(B)(3)(b) adding the product to the sharpened version of the source image at resolution l to produce an updated sharpened version of the source image at resolution l.

13. The method of claim 7, further comprising a step of:
(D) prior to the step (B), identifying average basis functions for each of the plurality of resolutions l; and
(E) prior to the step (B), for each of a plurality of densities d:
  (1) identifying a desired frequency response for density d; and
  (2) identifying gains for density d based on the average basis functions and the desired frequency response for density d;
wherein the step (B)(1) comprises a step of identifying as the gain G one of the gains identified in step (E)(2).

14. The method of claim 13, wherein the step (E)(2) comprises steps of:
(E)(2)(a) identifying a weighting function; and
(E)(2)(b) identifying gains for density d based on the average basis functions, the desired frequency response for density d, and the weighting function.

15. A device for processing a source image, the device comprising:
means for initializing a sharpened version of the source image;
iteration means comprising, for each of a plurality of resolutions l:
  first identification means for identifying a gain G associated with resolution l;
  second identification means for identifying a projection P of the source image onto a basis function B associated with resolution l;
  third identification means updating the sharpened version of the source image at resolution l based on the gain G and the projection P; and
provision means for providing the updated sharpened version of the source image as a final sharpened version of the source image.

16. The device of claim 15, wherein the second identification means comprises:
first means for obtaining a representation of the source image at resolution l;
second means for obtaining a low-pass band of the source image at resolution l; and
third means for obtaining a high-pass band of the source image at resolution l based on the representation of the source image at resolution l and the low-pass band of the source image at resolution l.

17. The device of claim 16, wherein the first means for obtaining comprises:
means for low-pass filtering the source image to produce a low-pass image; and
means for down-sampling the low-pass image to produce the representation of the source image at resolution l.

18. The device of claim 17, wherein the second means for obtaining comprises:
means for up-sampling the representation of the source image at resolution l to produce up-sampled image; and
means for low-pass filtering the up-sampled image to produce the low-pass band of the source image at resolution l.

19. The device of claim 18, wherein the third means for obtaining comprises means for subtracting the low-pass band from the source image to produce the high-pass band.

20. The device of claim 15, wherein provision means comprises:
means for multiplying the projection P by the gain G to produce a product; and
means for adding the product to the sharpened version of the source image at resolution l to produce an updated sharpened version of the source image at resolution l.

21. The device of claim 15, further comprising:
fourth identification means for identifying average basis functions for each of the plurality of resolutions l; and
iteration means comprising, for each of a plurality of densities d:
  fifth identification means for identifying a desired frequency response for density d; and
  sixth identification means for identifying gains for density d based on the average basis functions and the desired frequency response for density d;
wherein the first identification means comprises means for identifying as the gain G one of the gains identified by the sixth identification means.

22. The device of claim 21, wherein the sixth identification means comprises:
means for identifying a weighting function; and
means for identifying gains for density d based on the average basis functions, the desired frequency response for density d, and the weighting function.

* * * * *